UNITED STATES PATENT OFFICE.

NATHANIEL T. BACON, OF PEACE DALE, RHODE ISLAND, ASSIGNOR TO THE SOLVAY PROCESS COMPANY, OF SOLVAY, NEW YORK, A CORPORATION OF NEW YORK.

PROCESS OF TREATING ALKALINE WATERS.

1,330,573. Specification of Letters Patent. Patented Feb. 10, 1920.

No Drawing. Application filed June 20, 1919. Serial No. 305,633.

*To all whom it may concern:*

Be it known that I, NATHANIEL T. BACON, a citizen of the United States, residing at Peace Dale, in the county of Washington and State of Rhode Island, have invented certain new and useful Improvements in Processes of Treating Alkaline Waters, of which the following is a specification.

My invention relates generally to the treatment of alkaline lake waters such as the waters of Searles Lake in California for the recovery of their contents of value.

In processes directed to this end a usual preliminary step is the removal of as much as possible of the sodium carbonate content of the water by its conversion into insoluble sodium bicarbonate.

Heretofore this has been effected by subjecting the water to the action of carbonic acid gas derived from the burning of the limestone. This process however is expensive because of the cost of the limestone and the fact that the lime produced is, because of the distance from market, a waste product.

The object of my improvements is to effect an efficient precipitation of the sodium carbonates in a more economical manner than by the methods heretofore employed.

Theoretically the carbonic acid gas which can be set free by the decomposition of the sodium bicarbonate precipitated in the treatment of a given batch of lake water should be sufficient to convert the carbonate in the same quantity of water into bicarbonate, and if this were the case the process would be simple, the bicarbonate from each batch supplying the means for carbonating the succeeding batch. In practice, however, the available quantity of carbonic acid gas that can be produced in this way falls so far short of the theoretical that this otherwise desirable source of gas supply cannot be relied upon for the practical realization of the process.

I have found however that if a batch of fresh lake water be treated in the first instance, while carbonic acid is still greedily absorbed, with flue gases, which at such plants are readily available from the combustion of fuel required for concentrating solutions and other purposes, and subsequently with the very pure carbonic acid derived from the decomposition of sodium bicarbonate precipitated from a previously treated batch, the conversion of the sodium carbonate into bicarbonate is neatly and fully effected, since a sufficient conversion is effected by the carbonic acid in the flue gases to compensate for the deficiency that would be presented by the pure carbonic acid from the bicarbonate and the purity of the carbonic acid gas derived from the bicarbonate enables the ready conversion of the carbonate remaining after the partial conversion by the flue gases. The flue gases must be first and separately applied in the treatment of the solution and not in admixture with the carbonic acid gas from the bicarbonate since by such admixture the carbonic acid gas would be too largely diluted by the inert gases.

In treating the solution the flue gases are first brought into contact with it in any usual or well known manner, as in a wash tower.

Ordinarily in the preliminary treatment of the solution with flue gases it is not necessary to cool the solution, though the gases should be chilled as by washing them with crude brine or passing them over cooling tubes before bringing them in contact with the solution.

The bicarbonate of soda precipitated in the treatment of each batch of the alkaline water is readily decomposed, as by heating it in a closed vessel and the pure carbonic acid gas given off is then employed in completing the carbonation of the succeeding batch as by bringing it in intimate contact with the solution in a wash tower. During the treatment of the solution with the purer carbonic acid gas derived from the decomposition of the sodium bicarbonate the solution itself should be kept at a relatively low temperature, preferably not exceeding 40° C. This can be readily accomplished as by passing the solution over pipes containing chilled brine or in other well known ways.

Having thus described my invention what I claim as new and desire to secure by Letters Patent is:—

1. The process of precipitating sodium carbonates from alkaline brines which consists in first treating the brine with flue gas to effect a partial conversion of the lower carbonates into bicarbonate and then treating the brine with a purer carbonic acid gas to complete the conversion of the lower carbonates into bicarbonate.

2. The process of separating sodium carbonates from alkaline brines which consists in first treating the brine with flue gas to effect a partial conversion of the lower carbonates into bicarbonate, and then completing the conversion by means of carbonic acid gas derived from the decomposition of sodium bicarbonate.

3. The process of separating sodium carbonates from alkaline brines which consists in treating the brine with flue gas to effect a partial conversion of the lower carbonates into bicarbonate, decomposing sodium bicarbonate derived from the treatment of a preceding batch of brine and completing the conversion of the lower carbonates with the carbonic acid gas derived from the decomposition of the bicarbonate.

In testimony whereof I have affixed my signature this 18th day of June, 1919.

NATHANIEL T. BACON.